United States Patent
Jaime

(10) Patent No.: US 12,326,904 B1
(45) Date of Patent: Jun. 10, 2025

(54) ENRICHMENT OF SOFTWARE ECOSYSTEM GRAPH QUERIES

(71) Applicant: SAP SE, Walldorf (DE)

(72) Inventor: Damien Jaime, Nanterre (FR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/425,295

(22) Filed: Jan. 29, 2024

Related U.S. Application Data

(60) Provisional application No. 63/606,740, filed on Dec. 6, 2023.

(51) Int. Cl.
G06F 16/00 (2019.01)
G06F 16/901 (2019.01)
G06F 16/903 (2019.01)
G06F 16/9038 (2019.01)

(52) U.S. Cl.
CPC .... *G06F 16/90335* (2019.01); *G06F 16/9024* (2019.01); *G06F 16/9038* (2019.01)

(58) Field of Classification Search
CPC ........... G06F 16/90335; G06F 16/9038; G06F 16/9024
USPC ...................................................... 707/715
See application file for complete search history.

(56) References Cited

U.S. PATENT DOCUMENTS

2020/0104402 A1* 4/2020 Burnett ................. G06F 16/288

OTHER PUBLICATIONS

"The Maven Dependency Graph: a Temporal Graph-based Representation of Maven Central"; By: Amine Benelallam, Published 2019 (Year: 2019). https://ieeexplore.ieee.org/stamp/stamp.jsp?tp=&arnumber=8816814.*

"The Maven Dependency Graph: A Temporal Graph-Based Representation of Maven Central"; By: Amine Benelallam (Year: 2019) https://ieeexplore.ieee.org/stamp/stamp.jsp?tp=&arnumber=8816814.*

Abdalkareem, Rabe et al., "Why Do Developers Use Trivial Packages? An Empirical Case Study on npms", ESEC/FSE'17, Paderborn, Germany, Sep. 4-8, 2017, DOI: 10.1145/3106237.3106267, download from https://dl.acm.org/doi/pdf/10.1145/3106267, Retrieved on Mar. 27, 2024, (pp. 1-11, 11 total pages).

Benelallam, Amine et al., "The Maven Dependency Graph: a Temporal Graph-based Representation of Maven Central", arXiv:1901.05392v1 [cs.SE] Jan. 16, 2019, Sep. 6, 2018, download from https://arxiv.org/pdf/190105392, Retrieved on Mar. 27, 2024, (pp. 1-5, 5 total pages).

(Continued)

*Primary Examiner* — Chelcie L Daye
(74) *Attorney, Agent, or Firm* — Buckley, Maschoff & Talwalkar LLC

(57) ABSTRACT

Systems and methods include reception of a query of a dependency graph and a metric, the dependency graph comprising a first plurality of nodes representing code artifacts and a second plurality of nodes representing code artifact releases conforming to a first programming language, querying of the dependency graph with the query, receipt, in response to the query, a result set of nodes of the dependency graph, determination of values of the metric for each of the nodes of the result set of nodes, determination of an output based on the result set of nodes and the determined values, and presentation of the output.

15 Claims, 11 Drawing Sheets

(56) References Cited

OTHER PUBLICATIONS

Cox, Joel et al., "Measuring Dependency Freshness in Software Systems", Raboud Repository, download from https://repository.ubn.ru.nl/bitstream/handle/2066/143i749.pdf?sequence=1, Retrieved on Mar. 27, 2024, (pp. 1-11, 11 total pages).

Dann, Andres et al., "UPCY: Safely Updating Outdated Dependencies", download from https://www.bodden.de/pubs/dhb23upcy.pad, Retrieved on Mar. 27, 2024, (pp. 1-12, 12 total pages).

Jaime, Damien et al., "A preliminary study of rhythm and speed in the maven ecosystem", BENEVOL'22: The 21st Belgium-Netherlands Software Evolution Workshop, Sep. 12-13, 2022, Mons, Belgium, CEUR Workshop Proceedings (CEUR-WS.org), download from https://ceur-ws.org/Vol-3245/paper3.pdf, Retrieved on Mar. 27, 2024, (pp. 1-10, 10 total pages).

Jaime, Damien et al., "Goblin: A Framework for Enriching and Querying the Maven Central Dependency Graph", Published Dec. 8, 2023 | Version 1.0.1, download from https://zenodo.org/records/10306054, Retrieved on Mar. 27, 2024, (pp. 1-6, 6 total pages).

"Gobelin Dependency Miner", Goblin Dependency Miner, Dec. 7, 2023, download from https://github.com/Goblin-Ecosystem/goblinDependencyMiner, Retrieved on Mar. 24, 2024, (pp. 1-3, 3 total pages).

"Gobelin Weaver", Goblin-Ecosystem / goblinWeaver, Dec. 7, 2023, download from https://github.com/GHoblin-Ecosystem/goblinWeaver, Retrieved on Mar. 27, 2024, (pp. 1-3, 3 total pages).

"Maven Dataset And Weaver Experiences", Goblin-Ecosystem / mavenDatasetExperiences, Dec. 7, 2023, download from https://github.com/Goblin-Ecosystem/mavenDatasetExperiences, Retrieved on Mar. 27, 2024, (pp. 1-3, 3 total pages).

Litzenberger, Tobias et al., "DGMF: Fast Generation of Comparable, Updatable Dependency Graphs for Software Repositories", download from https://sse.cs.tu-dortmund.de/storages/sse-cs/r/Publications/Preprints/dgmf.pdf, (pp. 1-5, 5 total pages).

Raemaekers, Steven et al., "The Maven Repository Dataset of Metrics, Changes, and Dependencies", MSR 2013, San Francisco, CA, USA, download from https://dl.acm.org/doi/pdf/10.5555/2487085.2487129, (pp. 221-224, 4 total pages).

\* cited by examiner

```
{
    " query ": " MATCH ( a: Artifact ) -[e:relationship_AR ] - >( r: Release )
    WHERE a   id = 'org.apache.logging.log4j:log4j-core' RETURN r ",
    " addedValues ": [" CVE ", " FRESHNESS "]
}
```

```
{
    "query": "MATCH (r:Release)-[d:dependency]->(a:Artifact) WHERE r.id = '$GAV' AND d.scope = 'compile'
WITH a.id AS artifactId, d.targetVersion AS targetVersion MATCH (w:Release) WHERE w.id =
artifactId+':'+targetVersion RETURN w",
    "addedValues": ["CVE"]
}
```

*FIG. 7*

| Enriched Ecosystem Query Results |
|---|
| Direct dependencies: 2<br>Total dependencies: 35<br>Vulnerabilities: 2 TOTAL -> 0 CRITICAL, 2 HIGH, 0 MODERATE, 0 LOW<br>Detail vulnerabilities:<br><br>-------- com.fasterxml.jackson.core:jackson-databind:2.13.4.1--------<br>{cwe=[CWE-400,CWE-502], severity=HIGH, name=CVE-2022-42003}<br><br>-------- org.hibernate:hibernate-entitymanager:5.4.23.Final -> org.hibernate:hibernate-core:5.4.23.Final--------<br>{cwe=[CWE-89], severity=HIGH, name=CVE-2020-25638} |

*FIG. 8*

```
{
    "query": "MATCH (a:Artifact)-[e:relationship_AR]->(r:Release) WHERE a.id = '$GA' AND r.timestamp > $TIMESTAMP
RETURN r",
    "addedValues": ["CVE"]
}
```

*FIG. 9*

| Enriched Ecosystem Query Results |
|---|
| Alternatives without CVE:<br>com.fasterxml.jackson.core:jackson-databind:2.13.4.1:<br>  com.fasterxml.jackson.core:jackson-databind:2.15.0<br>  com.fasterxml.jackson.core:jackson-databind:2.15.2<br>  com.fasterxml.jackson.core:jackson-databind:2.15.1<br>  com.fasterxml.jackson.core:jackson-databind:2.14.3<br>  com.fasterxml.jackson.core:jackson-databind:2.14.2<br>...<br>org.hibernate:hibernate-core:5.4.23.Final:<br>  org.hibernate:hibernate-core:6.1.1.Final<br>  org.hibernate:hibernate-core:5.3.20.Final<br>  org.hibernate:hibernate-core:5.5.3.Final<br>  org.hibernate:hibernate-core:6.2.4.Final<br>  org.hibernate:hibernate-core:5.4.32.Final<br>... |

*FIG. 10*

```
{
    "query": "MATCH (a:Artifact) WHERE a.id = '$GA' RETURN a",
    "addedValues": ["SPEED"]
}
```

FIG. 11

| Enriched Ecosystem Query Results |
|---|
| Min: 21.86 days<br>Max: 21.90 days<br>Average: 21.88 days |

FIG. 12

```
{
    "query": "MATCH (a:Artifact) -[e:relationship_AR]-> (r:Release) -[d:dependency]->
(me:Artifact) WHERE me.id = '$GA'RETURN DISTINCT a",
    "addedValues": ["SPEED"]
}
```

| Enriched Ecosystem Query Results |
|---|
| Current speed: 112.17 days |
| |
| Min client speed: 0.20 days |
| Max client speed: 1295.50 days |
| Average client speed: 65.08 days |

ENRICHMENT OF SOFTWARE ECOSYSTEM GRAPH QUERIES

CROSS-REFERENCE TO RELATED APPLICATIONS

The present application claims the benefit of and priority to U.S. Provisional Patent Application Ser. No. 63/606,740, filed Dec. 6, 2023, the contents of which are incorporated herein by reference for all purposes.

BACKGROUND

Modern software development typically includes the reuse of existing code. Code reuse may reduce development time and improve software quality. The existing code may be stored in known publicly-accessible repositories and imported into software projects using a package manager. The package manager is specific to the programming language of the code to be imported (e.g., Maven for Java, NPM for JavaScript, PyPi for Python).

The existing code of a given programming language may define a software ecosystem of that programming language. Analysis of software ecosystems is integral to various empirical research fields such as software dependency management, artifact evolution and vulnerability analysis. Analysis of software ecosystems utilizes datasets representing the available packages, their associated metadata, and the relationships therebetween. These datasets are currently available in the form of dependency graphs and may be specific to a single ecosystem or may represent multiple ecosystems.

Systems are available for querying dependency graphs of software ecosystems. It is desirable to incorporate metrics associated with packages, releases and dependencies into such dependency graph queries. However, the inclusion of these metrics into a queriable dependency graph is problematic since the metrics are numerous and may evolve over time. Moreover, current dependency graphs represent a software ecosystem at a particular moment in time and cannot be used to query prior states of the software ecosystem.

BRIEF DESCRIPTION OF THE DRAWINGS

FIG. 7 illustrates an enriched dependency graph query according to some embodiments.

FIG. 8 illustrates results of the FIG. 7 query according to some embodiments.

FIG. 9 illustrates an enriched dependency graph query according to some embodiments.

FIG. 10 illustrates results of the FIG. 9 query according to some embodiments.

FIG. 11 illustrates an enriched dependency graph query according to some embodiments.

FIG. 12 illustrates results of the FIG. 11 query according to some embodiments.

FIG. 13 illustrates an enriched dependency graph query according to some embodiments.

FIG. 14 illustrates results of the FIG. 13 query according to some embodiments.

DETAILED DESCRIPTION

Some embodiments provide a dependency graph metamodel for code artifacts which includes time-related information and a tool designed to facilitate dynamic enrichment of queries on dependency graphs which conform to the metamodel. The metamodel and the tool form a customizable framework for the analysis and management of software dependencies, and more generally for the analysis of software ecosystems. For example, embodiments allow users to retrieve a subgraph of dependencies corresponding to their project and to enrich the retrieved subgraph with known direct and indirect security vulnerabilities. The tool is extensible to accommodate any metrics, including but not limited to CVEs (i.e., Common Vulnerabilities and Exposures), artifact freshness (i.e., time since last release), and artifact release speed (i.e., number of releases per day/week/month).

To facilitate the study of dependency quality and replacement within applications written in Java, a Maven Central dataset may be represented by a Neo4J dependency graph conforming to a metamodel according to some embodiments. A Cypher query is executed on the Neo4J dependency graph, and the query result is dynamically enriched with additional information defined by the user. Embodiments are not limited to Java and the Maven Central dataset.

Figure 1:
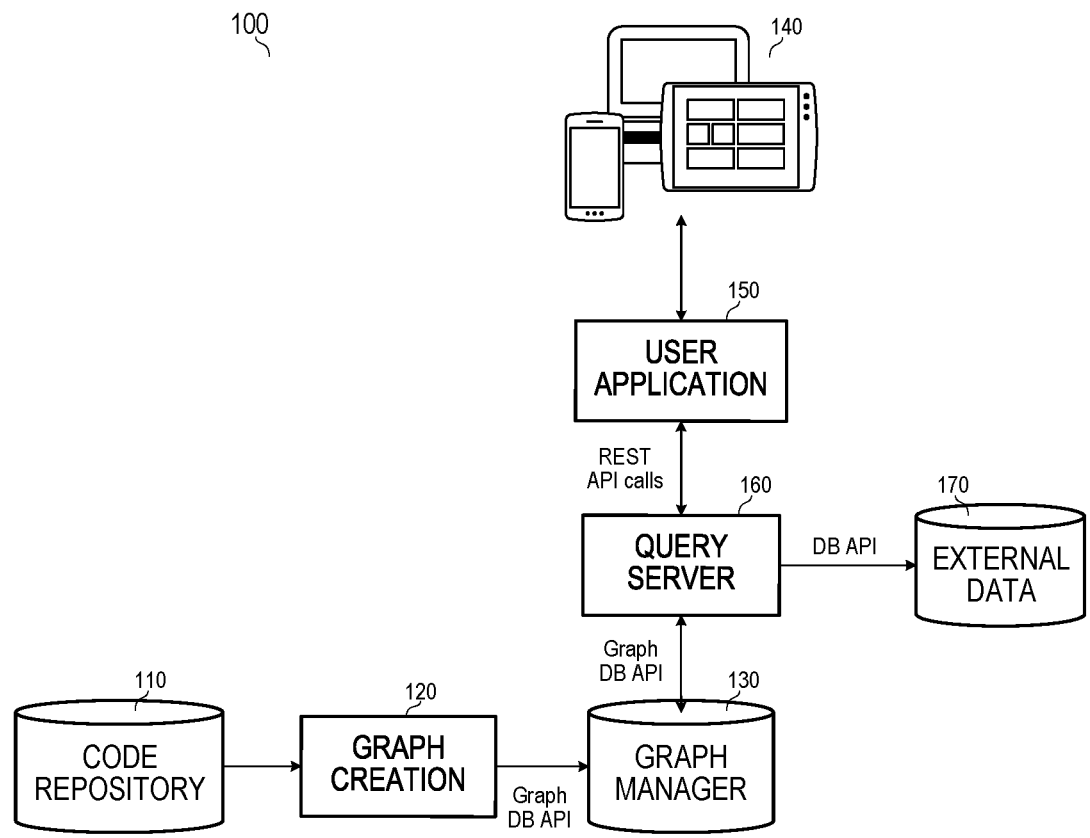
FIG. 1 illustrates a system to enrich queries of a software ecosystem dependency graph according to some embodiments.

FIG. 1 illustrates system 100 to enrich queries of a software ecosystem dependency graph according to some embodiments. Each of the illustrated components may be implemented using any suitable combination of computing hardware and/or software that is or becomes known. A combination of computing hardware may comprise one or more processing units (e.g., processors, processor cores, processor threads) configured to execute program code to cause operation as described herein, and memory storing the program code (e.g., any non-transitory media including but not limited to one or more fixed disks, solid-state random access memory, and removable media (e.g., a thumb drive) mounted in a corresponding interface (e.g., a USB port)).

In some embodiments, two or more components are implemented by a single computing device. Two or more components of system 100 may be co-located. One or more components may be implemented as a cloud service (e.g., Software-as-a-Service, Platform-as-a-Service). A cloud-based implementation of any components of system 100 may apportion computing resources elastically according to demand, need, price, and/or any other metric.

Each component may comprise, for example, comprise a single computer server, a virtual machine, or a cluster of computer servers such as a Kubernetes cluster. Kubernetes is an open-source system for automating deployment, scaling and management of containerized applications. Each component of system 100 may therefore be implemented by one or more servers (real and/or virtual) or containers. Each data storage component depicted herein may comprise one or more storage systems, each of which may be standalone or distributed, on-premise or cloud-based.

System 100 includes code repository 110. Code repository 110 stores project-specific code artifacts which may include libraries, plug-ins, packages including class files and associated metadata and resources. Code repository 110 also stores artifact dependency and artifact version (i.e., release) metadata. The artifacts of code repository 110 may conform to a single programming language or multiple programming languages. Code repository 110 may be implemented by any forms of standalone or distributed storage systems that are or become known, including but not limited to code hosting platforms.

Graph creation component 120 generates a dependency graph based on the code artifacts and metadata of code repository 110. The generated dependency graph conforms to a metamodel as will be described below. According to some embodiments, graph creation component 120 is a software application which retrieves all artifact releases from code repository 110 and calls an API of graph manager 130 to creates artifact nodes, release nodes and version edges of a dependency graph based on the artifact releases. Next, the direct dependencies of each release are retrieved using the org.eclipse.aether library and edges representing the direct dependencies are created between corresponding release and artifact nodes. The org.eclipse.aether library is associated with the Maven Central repository and another library would be used to retrieve direct dependencies associated with another software ecosystem. The resulting dependency graph, which may comprise a Neo4J dependency graph in some embodiments, is stored in graph manager 130.

To update a previously-created dependency graph, graph creation component 120 retrieves artifact releases from code repository 110 and adds artifact nodes, release nodes and version edges to the dependency graph based on the retrieved artifact releases which have a timestamp later than the latest timestamp of the current dependency graph. Direct dependencies of the later releases are retrieved and new edges representing the direct dependencies are created between corresponding release nodes of the dependency graph.

System 100 includes user devices 140 which may be operated by administrators or users of a customer, or tenant. In some embodiments, each of user devices 140 executes a Web browser for accessing user application 150. For example, a Web browser of a user device 140 may issue HTTP requests to receive Web pages from user application 150 and/or execute code of a browser application to interact with user application 150 in order to present user interfaces.

User application 150 issues REST API calls to query server 160 based on user input to user application 150. A REST API call may include a Neo4J Cypher query of a dependency graph and also specify one or more additional metrics. External data 170 comprises a storage system which stores values of the one or more additional metrics for each of one or more nodes and edges of the dependency graph. Accordingly, query server 160 accesses external data 170 in order to determine values of the one or more additional metrics for each of the objects returned in response to the Cypher query.

In a specific example, the REST API call received by query server 160 is formatted as: POST/cypher {"query": QUERY, "addedValues":[(added value)*]}, where QUERY is a Cypher query. In response to the call, query server 160 sends the Cypher query to graph manager 130 and receives a result set of objects (i.e., nodes and/or edges) from graph manager 130 in return. Query server 160 then accesses external data 170 to determine objects of the result set to which the added value applies and to compute the added value for each of such objects. According to some embodiments, query server 160 retrieves the information stored in external data 170 on initialization and stores the information locally to achieve faster response times at runtime.

Query server 160 returns a result including the objects and associated added values to user application 150, which presents the result to a user via one of user devices 140. The result may be returned to user application 150 in JSON format, and user application 150 may present the result to a user in any suitable manner. Presentation of the result may include post-processing of the JSON-formatted result.

In one example, query server 160 receives the following query and additional metric from user application 150:

{"query": "MATCH (r: Release) RETURN r", "addedValues": ["CVE"]}

The intent of the above payload is to return all release nodes of the dependency graph and their associated CVE information (from, e.g., external information data). User application 150 may then perform post-processing to count the number of returned releases which are associated with at least one CVE.

In another example, it is desired to determine the number of latest releases of each artifact which are associated with at least one CVE. The above query is therefore modified to return only the last release associated with each artifact, based on the associated timestamps: {"query": "MATCH (a: Artifact) WITH a MATCH (a)-[: relationship_AR]→(r: Release) WITH a, r ORDER BY r. timestamp DESC WITH a, COLLECT (r)[0] AS mostRecentRelease RETURN mostRecentRelease", "addedValues": ["CVE"]}. User application 150 may then perform post-processing to count the number of returned latest releases which are associated with at least one CVE.

Query server 160 can compute CVE, freshness or speed locally (i.e., the CVE/freshness/speed of a particular release) or in an aggregated manner (i.e., sum/avg/max/min of the CVEs/freshness/speed of a release and of its directly- and indirectly-dependent releases). For example, if a given release is not associated with a CVE but imports a release that is associated with a CVE, no CVE value will be returned for the given release if its CVE value is queried, but a CVE value will be returned for the given release if its aggregated CVE value is queried.

The metrics can also be computed at a point in time or over a period of time. Query server 160 advantageously adds the computed metrics to the query results on-demand, alleviating a need to store and regularly update all the metrics within the dependency graph itself.

Figure 2:
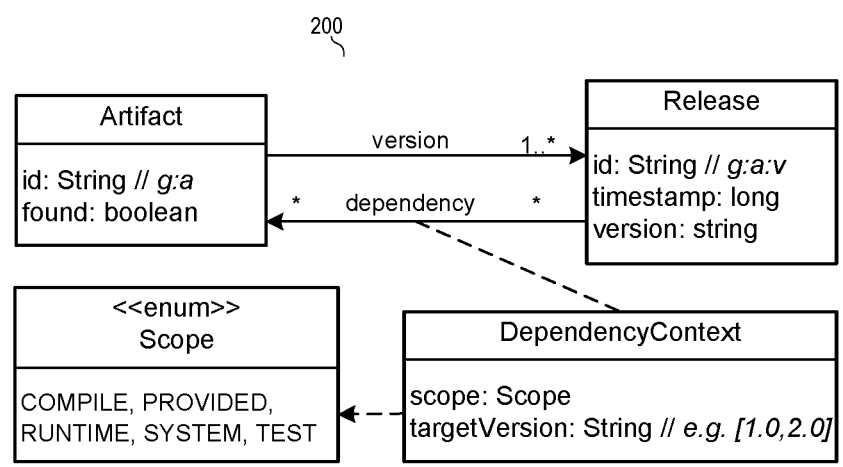
FIG. 2 illustrates a dependency graph model according to some embodiments.

FIG. 2 illustrates dependency graph model 200 according to some embodiments. A dependency graph according to some embodiments may conform to model 200. According to model 200, an Artifact node represents a software artifact identified by its "g:a" (group ID and artifact ID) and indicates whether the artifact is present (i.e., "found") or not in the code repository. A Release node represents a software artifact version identified by its "g:a:v" (group ID, artifact ID and version) and includes timestamp and version fields. Edges represent either version={(a, r)|a ∈ Artifact, r ∈ Release} to identify all releases of an artifact, or dependency={(r, a)|r ∈ Release, a ∈ Artifact} to represents dependency defined by the artifact target version (or range of versions) and the scope (compile, provided, runtime, system or test). The Release timestamps and DependencyContexts enable tracking of time-based changes and "rewinding" in time, while the DependencyContext scope assists in filtering out non-essential dependencies (e.g., tests).

Figure 3:
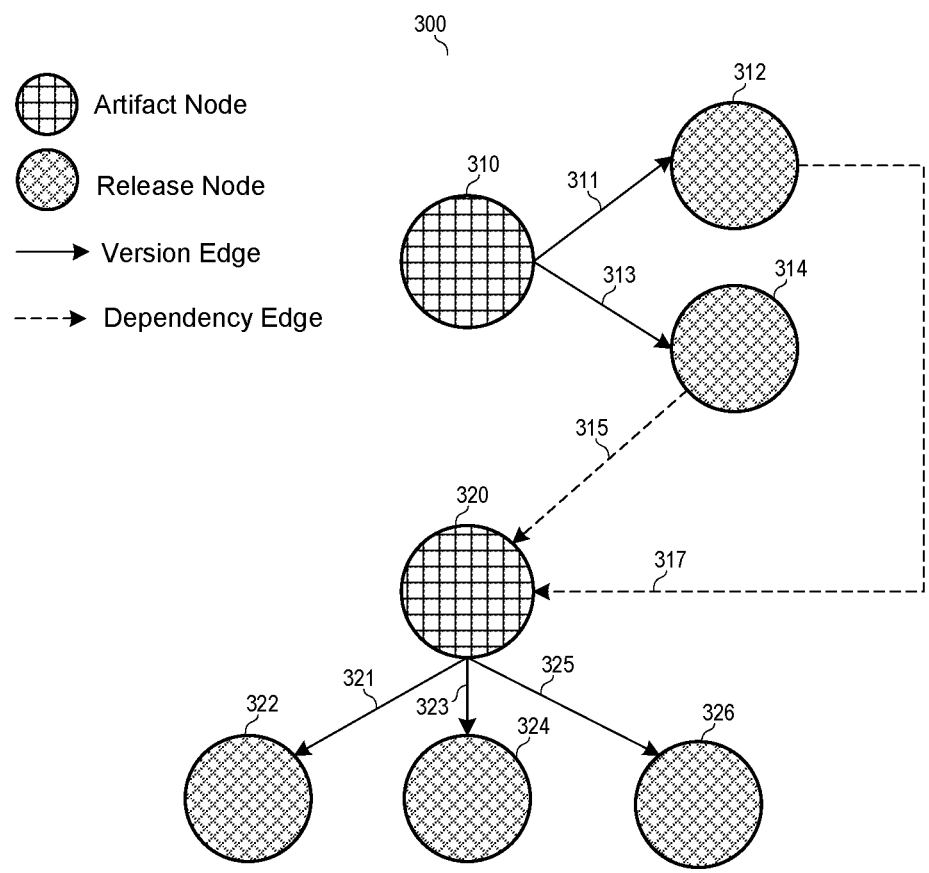
FIG. 3 illustrates a dependency graph according to some embodiments.

FIG. 3 illustrates dependency graph 300 generated from a code artifact repository according to some embodiments. Dependency graph 300 may be generated by a graph creation component as described above. A dependency graph in an actual implementation is expected to include many more nodes and edges than shown in dependency graph 300.

Dependency graph 300 conforms to model 200 of FIG. 2. Dependency graph 300 includes Artifact nodes 310 and 320 representing artifacts, Release nodes 312 and 314 representing versions of the artifact of Artifact node 310 and associated therewith via Version edges 311 and 313, and Release nodes 322, 324 and 326 representing versions of the artifact of Artifact node 320 and associated therewith via Version edges 321, 323 and 325. Dependency edges 315 and 317 represent respective dependencies between Release nodes 312, 314 and Artifact node 320. Each of Dependency edges 315 and 317 is associated with a DependencyContext as depicted in model 200.

Figure 4:
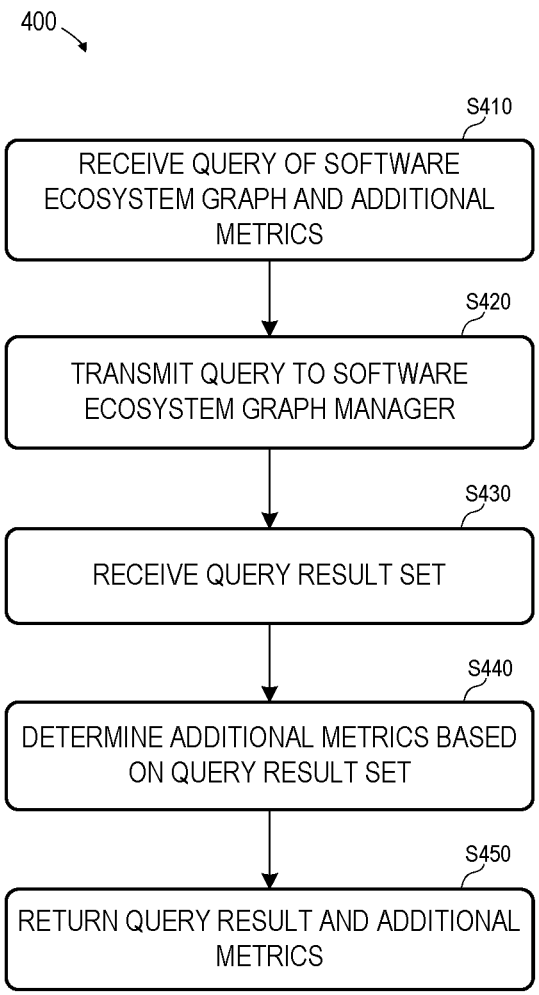
FIG. 4 is a flow diagram of a process to enrich queries of a software ecosystem dependency graph according to some embodiments.

FIG. 4 is a flow diagram of process 400 to enrich queries of a software ecosystem dependency graph according to some embodiments. Process 400 may be executed by a query server such as query server 160, but embodiments are not limited thereto. At S410, a query of a software ecosystem dependency graph is received along with one or more additional metrics. In one example, the dependency graph is a Neo4J graph and the query is a Cypher query.

The query is transmitted to a manager of the graph (e.g., a graph database management system) at S420, which executes the query on the graph to generate a result set. The result set is received at S430. Next, the additional one or more metrics received with the query at S410 are determined based on the query result set. For example, the result set may identify several releases which satisfy filters of the query. The additional one or more metrics are determined for each identified release, either locally (i.e., where the metric of a release is based only on the release) or in aggregation (i.e., where the metric of a release may be based on the release and on other releases).

The query result and additional metrics are returned at S450. The query result and additional metrics may then be displayed to a user in some embodiments. The query result and additional metrics may be referred to as an enriched query result, while the query and one or more additional metrics received at S410 may be referred to as an enriched dependency graph query.

Figures 5, 6:
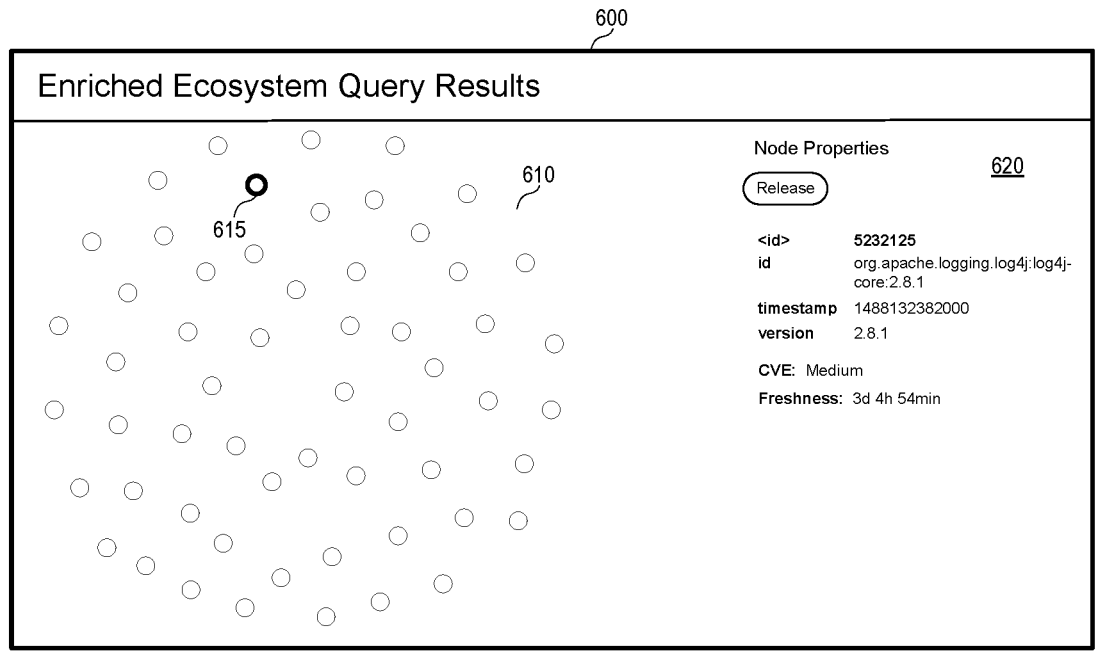
FIG. 5 illustrates an enriched dependency graph query according to some embodiments.
FIG. 6 illustrates results of the FIG. 5 query according to some embodiments.

FIG. 5 illustrates enriched dependency graph query 500 which may be received at S410 according to some embodiments. Enriched dependency graph query 500 is intended to retrieve all releases of a specific artifact (org.apache.logging.log 4j:log 4j-core) and their associated external CVE and freshness information, if any. User interface 600 of FIG. 6 depicts a graphical presentation of a corresponding enriched query result, where each of icons 610 represents a release of the artifact returned by the query portion of enriched dependency graph query 500 and panel 620 provides the properties and the CVE and freshness values of the release represented by selected icon 615.

FIG. 7 illustrates enriched dependency graph query 700 which may be received at S410 according to some embodiments. Enriched dependency graph query 700 requests a project dependency tree including the compile dependencies of a release and the CVEs thereof, if any. Post-processing is then performed to determine an output including the number of dependencies of the dependency tree and the dependencies which are associated with a CVE. Interface 800 of FIG. 8 presents the output, including the number of dependencies of the dependency tree and the two dependencies which are associated with a CVE.

In another example, enriched dependency graph query 900 of FIG. 9 requests newer releases of releases associated with a CVE, along with the CVE information, if any, of the newer releases. An output is determined consisting of the newer releases which are not associated with a CVE. Interface 1000 of FIG. 10 presents these newer releases which are not associated with a CVE, thereby providing a list of alternative releases to substitute for releases which are associated with a CVE.

At the project level, a developer may wish to plan dependency management strategies and anticipate potential updates or changes. For example, embodiments may be used to determine a suitable interval at which to update the dependencies of a project. Enriched dependency graph query 1100 of FIG. 11 is executed to retrieve the direct dependencies and determine the speed (e.g., number of releases per day) of the corresponding artifacts based on the timestamps of the artifacts within the dependency graph. An output may then be determined based on the retrieved direct dependencies and determined speeds. For example, interface 1200 of FIG. 12 presents the average, minimum, and maximum speeds of the dependencies. Since the average release time for new versions of the project's dependencies is 21.88 days, a developer may determine to check the dependencies of the project every 22 days.

Conversely, a release provider may wish to determine an appropriate interval for the release of new versions. Enriched dependency graph query 1300 of FIG. 13 may be used to determine the speed of all releases (i.e., clients) which depend on a particular release. Interface 1400 of FIG. 14 presents the speed of the particular release (i.e., 112.17 days), and an output consisting of the minimum, maximum, and average speeds of the client releases.

Since some dependency graph queries are expected to recur, some embodiments of query server 160 allow dependency graph queries including "shortcut" routes (with specific parameters). For example, the general form of the REST API calls sent to query server may be POST route {(param:value)*, "addedValues".[(added value)*]}, with different routes (including the low-level/cypher route) having different sets of parameters. Query server 160 translates queries of non-/cypher routes to queries on the/cypher route and provides the translated queries to graph manager 130.

Figure 15:
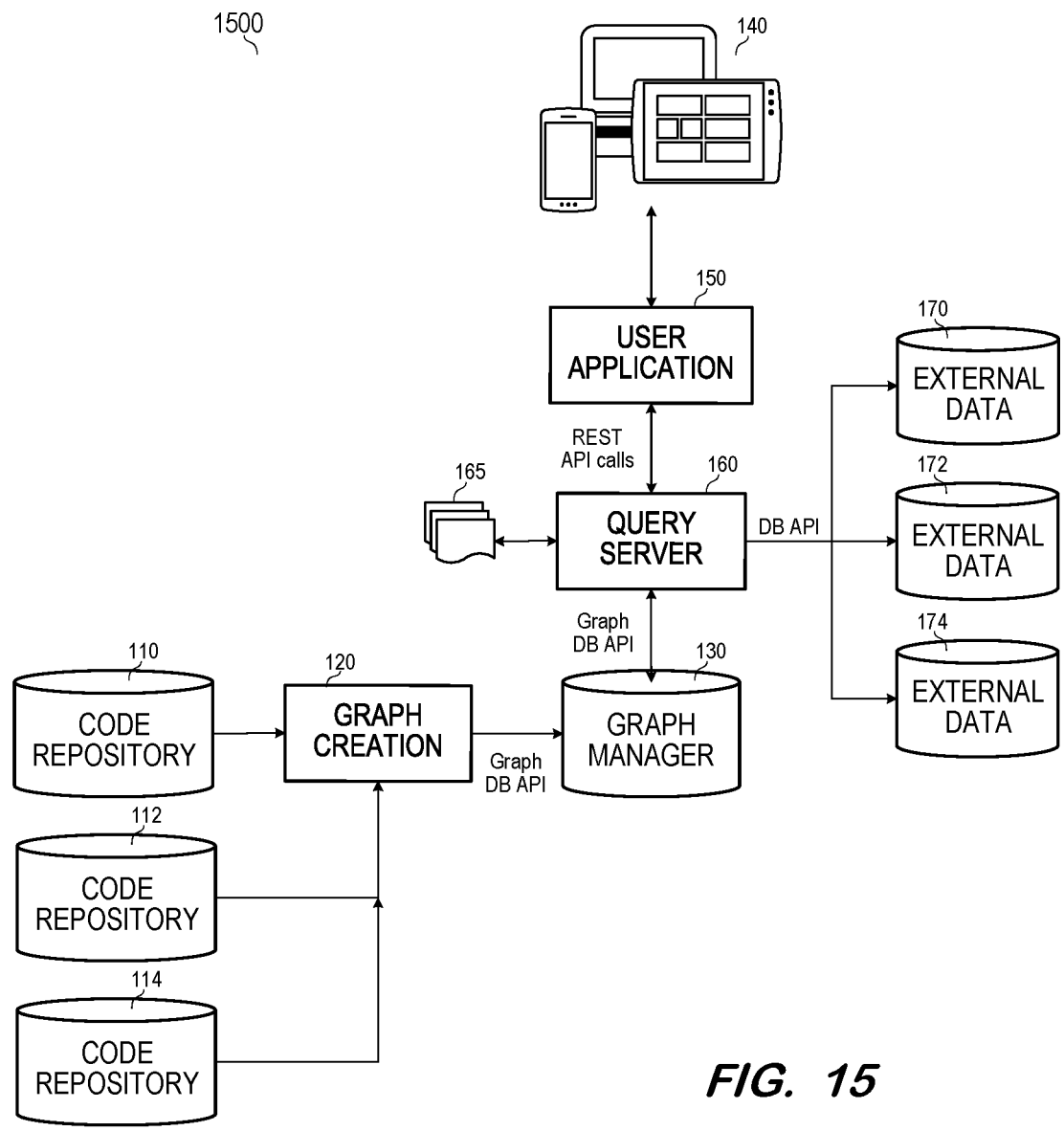
FIG. 15 illustrates a system to enrich queries of a software ecosystem dependency graph according to some embodiments.

FIG. 15 illustrates system 1500 to enrich queries of a software ecosystem dependency graph according to some embodiments. System 1500 includes, in addition to components described above with respect to FIG. 1, code repository 112, code repository 114, external data 172 and external data 174. Embodiments are not limited to any particular number of code repositories and/or external data stores.

According to some embodiments, each of code repositories 110, 112 and 114 stores code conforming to a different programming language. Graph creation component 120 may therefore create a different dependency graph within graph manager 130 for each of the programming languages. Two or more of code repositories 110, 112 and 114 may store code conforming to the same programming language, and graph creation component 120 may create a single dependency graph based on the code stored in the two or more code repositories.

External data 170, 172 and 174 store metric values associated with code artifacts and releases. Each of external data 170, 172 and 174 may store values of a dedicated one or more metrics and/or conforming to a single programming language. On the other hand, two or more of external data 170, 172 and 174 may store values of a same metric and/or associated with two or more programming languages.

According to some embodiments, query server 160 accesses metric values of one or more of external data 170, 172 and 174 upon initialization and generates JSON files 165 comprising the accessed metric values and identifiers of associated code artifacts/releases. JSON files 165 may be stored locally to query server 160 to facilitate faster execution and require fewer networks calls to enrich query results with additional metrics as described herein.

Figure 16:
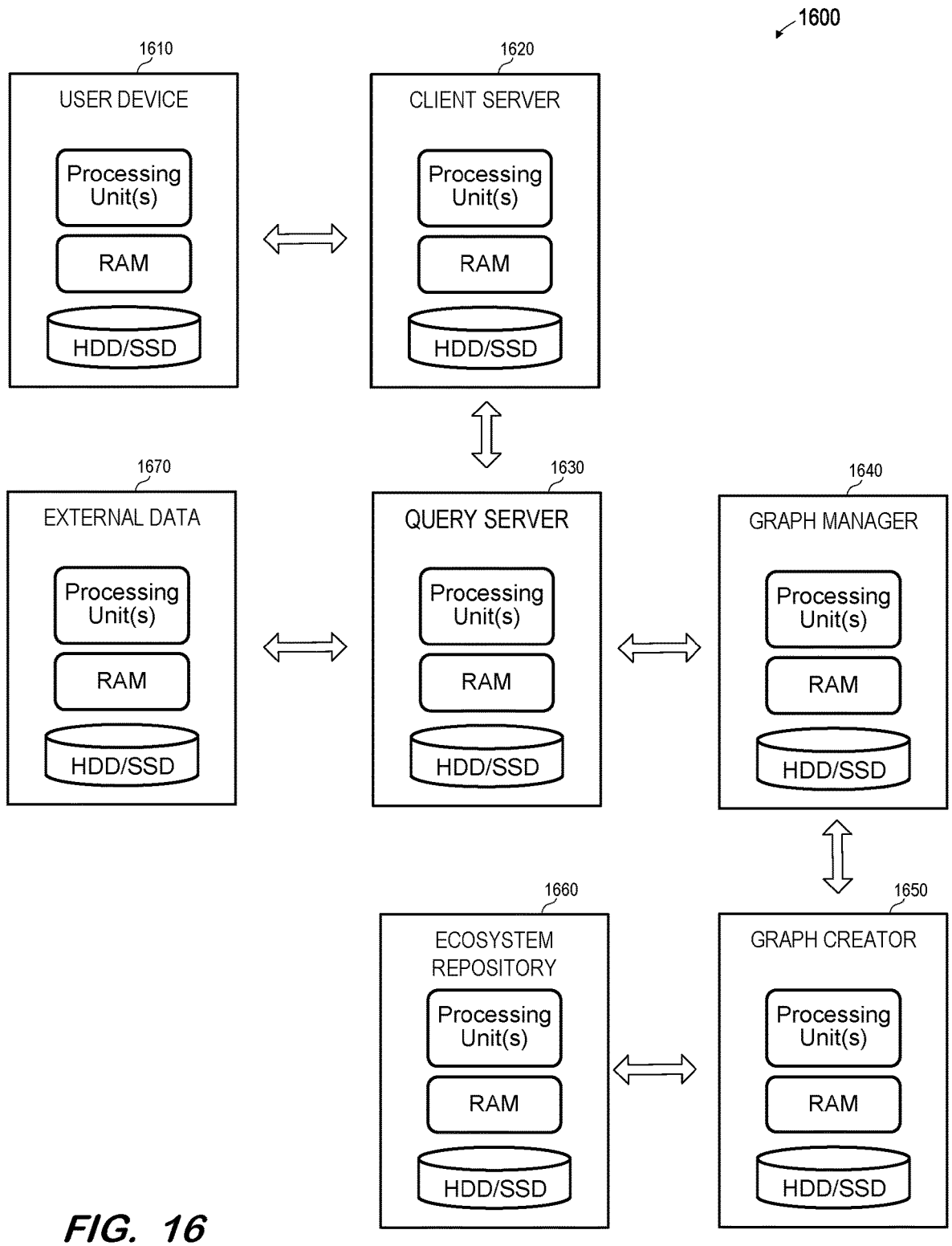
FIG. 16 illustrates a distributed system to enrich queries of a software ecosystem dependency graph according to some embodiments.

FIG. 16 is a block diagram of cloud-based architecture 1600 according to some embodiments. Client server 1620, query server 1630, graph manager 1640 and graph creator 1650 may comprise cloud-based compute resources, such as one or more virtual machines, allocated by a public cloud provider providing self-service and immediate provisioning, autoscaling, security, compliance and identity management features. Client server 1620, query server 1630, graph manager 1640 and graph creator 1650 may execute containerized applications deployed in Docker containers on Kubernetes. A user may operate user device 1610 to interact with client server 1620 to request information regarding a software ecosystem. The remaining components of architecture 1600, including ecosystem repository 1660 and external data 1670, may operate as described above to assist in providing enriched query results to the user.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
a memory storing executable program code; and
at least one processing unit to execute the program code to cause the system to:
for each of a plurality of code artifacts, retrieve artifact dependency metadata and artifact release metadata from a code repository;
generate a dependency graph based on the artifact dependency metadata and artifact release metadata, the dependency graph comprising a first plurality of nodes representing respective ones of the plurality of code artifacts and a second plurality of nodes representing code artifact releases, where each of the second plurality of nodes is associated with a timestamp and a version based on corresponding artifact release metadata and is connected to one of the first plurality of nodes based on corresponding artifact dependency metadata;
receive a query including a node filter and a release frequency metric;
receive, in response to the query, a result set of nodes of the dependency graph whose associated timestamps satisfy the node filter;
determine a release frequency for each node of the result set of nodes based on the timestamp associated with each node of the result set of nodes;
determine a value of the release frequency metric based on the determined release frequencies; and
present the value.

2. The system according to claim 1, wherein receipt of the query comprises receipt of a second metric.

3. The system according to claim 2, wherein the second metric is Common Vulnerabilities and Exposures.

4. The system according to claim 2, wherein values of the second metric for each of the nodes of the result set are requested from an external storage system.

5. The system of claim 2, the at least one processing unit to execute the program code to cause the system to:
receive values of the second metric from an external storage system; and
store JSON files comprising the received values.

6. A method executable by a computing system, the method comprising:
for each of a plurality of code artifacts, retrieving artifact dependency metadata and artifact release metadata from a code repository;
generating a dependency graph based on the artifact dependency metadata and artifact release metadata, the dependency graph comprising a first plurality of nodes representing respective ones of the plurality of code artifacts and a second plurality of nodes representing code artifact releases-, where each of the second plurality of nodes is associated with a timestamp and a version based on corresponding artifact release metadata and is connected to one of the first plurality of nodes based on corresponding artifact dependency metadata;
receiving a query including a node filter and a release frequency metric;
receiving, in response to the query, a result set of nodes of the dependency graph whose associated timestamps satisfy the node filter;
determining a release frequency for each node of the result set of nodes based on the timestamp associated with each node of the result set of nodes;
determining a value of the release frequency metric based on the determined release frequencies; and
presenting the value.

7. The method according to claim 6, wherein receiving the query comprises receipt of a second metric.

8. The method according to claim 7, wherein the second metric is Common Vulnerabilities and Exposures.

9. The method according to claim 7, wherein values of the second metric for each of the nodes of the result set are requested from an external storage system.

10. The method of claim 7, further comprising:
receiving values of the second metric from an external storage system; and
storing JSON files comprising the received values.

11. A non-transitory medium storing program code executable by at least one processing unit of a computing system to cause the computing system to:
- for each of a plurality of code artifacts, retrieve artifact dependency metadata and artifact release metadata from a code repository;
- generate a dependency graph based on the artifact dependency metadata and artifact release metadata, the dependency graph comprising a first plurality of nodes representing respective ones of the plurality of code artifacts and a second plurality of nodes representing code artifact releases-, where each of the second plurality of nodes is associated with a timestamp and a version based on corresponding artifact release metadata and is connected to one of the first plurality of nodes based on corresponding artifact dependency metadata;
- receive a query including a node filter and a release frequency metric;
- receive, in response to the query, a result set of nodes of the dependency graph whose associated timestamps satisfy the node filter;
- determine a release frequency for each node of the result set of nodes based on the timestamps associated with each node of the result set of nodes;
- determine a value of the release frequency metric based on the determined release frequencies; and
- present the value.

12. The medium according to claim 11, wherein receipt of the query comprises receipt of a second metric.

13. The medium according to claim 12, wherein the second metric is Common Vulnerabilities and Exposures.

14. The medium according to claim 12, wherein values of the second metric for each of the nodes of the result set are requested from an external storage system.

15. The medium of claim 12, the program code executable by at least one processing unit of a computing system to cause the computing system to:
- receive values of the second metric from an external storage system; and
- store JSON files comprising the received values.

* * * * *